(12) United States Patent
Deng et al.

(10) Patent No.: US 12,158,643 B2
(45) Date of Patent: Dec. 3, 2024

(54) DISPLAY DEVICES

(71) Applicant: WUHAN CHINA STAR OPTOELECTRONICS TECHNOLOGY CO., LTD., Hubei (CN)

(72) Inventors: Qian Deng, Hubei (CN); Wei Cheng, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 18/250,988

(22) PCT Filed: Mar. 31, 2023

(86) PCT No.: PCT/CN2023/085732
§ 371 (c)(1),
(2) Date: Apr. 28, 2023

(87) PCT Pub. No.: WO2024/103607
PCT Pub. Date: May 23, 2024

(65) Prior Publication Data
US 2024/0345427 A1    Oct. 17, 2024

(30) Foreign Application Priority Data
Nov. 14, 2022   (CN) .......................... 202211424091.2

(51) Int. Cl.
G02F 1/13       (2006.01)
G02F 1/1347     (2006.01)

(52) U.S. Cl.
CPC .......... *G02F 1/1323* (2013.01); *G02F 1/1347* (2013.01)

(58) Field of Classification Search
CPC ............................ G02F 1/1323; G02F 1/1347
See application file for complete search history.

(56) References Cited

FOREIGN PATENT DOCUMENTS

| CN | 105242473 A | 1/2016 |
|----|-------------|--------|
| CN | 205301766 U | 6/2016 |
| CN | 113552741 A | 10/2021 |
| CN | 113589578 A | 11/2021 |
| CN | 115236905 A | 10/2022 |
| CN | 115718389 A | 2/2023 |
| WO | 0225364 A1  | 3/2002 |

OTHER PUBLICATIONS

International Search Report in International application No. PCT/CN2023/085732, mailed on Aug. 2, 2023.
Written Opinion of the International Search Authority in International application No. PCT/CN2023/085732, mailed on Aug. 2, 2023.

*Primary Examiner* — Donald L Raleigh
(74) *Attorney, Agent, or Firm* — PV IP PC; Wei Te Chung

(57) ABSTRACT

The present disclosure discloses a display device including a display panel and a dimming apparatus located on a light-emitting side of the display panel. The dimming apparatus includes a cholesteric liquid crystal layer; when the display device is in an anti-peek mode, the cholesteric liquid crystal layer is in a reflective state.

20 Claims, 6 Drawing Sheets

DISPLAY DEVICES

TECHNICAL FIELD

The disclosure relates to display technologies, in particular to display devices.

BACKGROUND

With advancement of technology and iteration of consumer electronics, a problem of privacy protection is increasingly concerned by users. Users do not want others to see display pictures on display devices in some situations, which requires that the display devices can have an anti-peek function to prevent others within a range of a viewing angle of the display devices from seeing contents of the display pictures, and to provide target users with content readability at a protected visible angle.

Display screens in conventional anti-peek display devices are generally covered by a single layer of an anti-peek film. However, because the anti-peek film is a bidirectional anti-peek film, double orthogonal anti-peek films are needed to be attached on the display screens to achieve an anti-peek function at full viewing angles. However, a design of the double orthogonal anti-peek films significantly reduces display brightness of the display devices at positive viewing angles.

Technical Problems

A purpose of the present disclosure is to provide a display device to solve a problem of decrease in display brightness of conventional anti-peek display devices at positive viewing angles.

Technical Solutions

To achieve the above-mentioned purpose, technical solutions are as following.

An embodiment of the present disclosure provides a display device operable in an anti-peek mode, and the display device includes:
- a display panel; and
- a dimming apparatus, located on a light-emitting side of the display panel, wherein the dimming apparatus includes a cholesteric liquid crystal layer which includes cholesteric liquid crystals operable in a reflective state;
- wherein upon a condition that the cholesteric liquid crystal layer is in the reflective state while the display device is in the anti-peek mode, a maximum of a reflectivity of the cholesteric liquid crystal layer in the reflective state to infrared light with an incident angle less than or equal to half of a visible angle in the anti-peek mode, is greater than a maximum of a reflectivity of the cholesteric liquid crystal layer to visible light with an incident angle less than or equal to half of the visible angle in the anti-peek mode; and a maximum of a reflectivity of the cholesteric liquid crystal layer in the reflective state to infrared light with an incident angle greater than half of the visible angle in the anti-peek mode, is less than a maximum of a reflectivity of the cholesteric liquid crystal layer to visible light with an incident angle greater than half of the visible angle in the anti-peek mode, where the incident angle is defined as an included angle between an incident direction and a helical axis of the cholesteric liquid crystals of the cholesteric liquid crystal layer in the reflective state, and the helical axis is parallel to a thickness direction of the cholesteric liquid crystal layer.

In the display device of some embodiments, half of the visible angle in the anti-peek mode ranges between 0 degrees and 30 degrees.

In the display device of some embodiments, the maximum of the reflectivity of the cholesteric liquid crystal layer in the reflective state to the visible light with the incident angle less than or equal to half of the visible angle in the anti-peek mode is less than or equal to 15%.

In the display device of some embodiments, the reflectivity of the cholesteric liquid crystal layer in the reflective state to infrared light perpendicularly entering the cholesteric liquid crystal layer with a wavelength ranging between 760 nm and 900 nm is a maximum.

In the display device of some embodiments, a screw pitch of the cholesteric liquid crystals in the reflective state ranges between 460 nm and 600 nm.

In the display device of some embodiments, the cholesteric liquid crystals include chiral additives ranging between 10% and 15% by weight.

In the display device of some embodiments, a reflectivity of the cholesteric liquid crystal layer in the reflective state to green light with an incident angle greater than half of the visible angle in the anti-peek mode, is greater than a reflectivity of the cholesteric liquid crystal layer to blue light with an incident angle greater than half of the visible angle in the anti-peek mode.

In the display device of some embodiments, the display device further has a sharing mode, and the cholesteric liquid crystal layer further has a transparent state; and
- wherein the cholesteric liquid crystal layer is in the transparent state when the display device is in the sharing mode.

In the display device of some embodiments, the display device further has an enhanced sharing mode, and the cholesteric liquid crystal layer further has a fog state; and
- wherein the cholesteric liquid crystal layer is in the fog state when the display device is in the enhanced sharing mode.

In the display device of some embodiments, the cholesteric liquid crystal layer is located between a first electrode layer and a second electrode layer of the dimming apparatus;
- when the cholesteric liquid crystal layer is in the reflective state, a first voltage difference is defined between the first electrode layer and the second electrode layer;
- when the cholesteric liquid crystal layer is in the transparent state, a second voltage difference is defined between the first electrode layer and the second electrode layer;
- when the cholesteric liquid crystal layer is in the fog state, a third voltage difference is defined between the first electrode layer and the second electrode layer; and
- wherein an absolute value of the first voltage difference is less than an absolute value of the third voltage difference, and the absolute value of the third voltage difference is less than an absolute value of the second voltage difference.

An embodiment of the present disclosure further provides a display device operable in an anti-peek mode, the display device includes a liquid crystal display panel and a dimming apparatus located on a light-emitting side of the liquid crystal display panel, and the dimming apparatus includes:
- a cholesteric liquid crystal layer, including cholesteric liquid crystals operable in a reflective state;

wherein upon a condition that the cholesteric liquid crystal layer is in the reflective state while the display device is in the anti-peek mode, a maximum of a reflectivity of the cholesteric liquid crystal layer in the reflective state to infrared light with an incident angle less than or equal to half of a visible angle in the anti-peek mode, is greater than a maximum of a reflectivity of the cholesteric liquid crystal layer to visible light with an incident angle less than or equal to half of the visible angle in the anti-peek mode; and a maximum of a reflectivity of the cholesteric liquid crystal layer in the reflective state to infrared light with an incident angle greater than half of the visible angle in the anti-peek mode, is less than a maximum of a reflectivity of the cholesteric liquid crystal layer to visible light with an incident angle greater than half of the visible angle in the anti-peek mode, where the incident angle is defined as an included angle between an incident direction and a helical axis of the cholesteric liquid crystals of the cholesteric liquid crystal layer in the reflective state, and the helical axis is parallel to a thickness direction of the cholesteric liquid crystal layer.

In the display device of some embodiments, the display device further includes a backlight module configured to emit backlight, wherein the dimming apparatus is located between the liquid crystal display panel and the backlight module.

Beneficial Effects

The present disclosure provides the display device, and the display device is provided with the dimming apparatus located on the light-emitting side of the display panel. The dimming apparatus includes the cholesteric liquid crystal layer operable in the reflective state, the maximum of the reflectivity of the cholesteric liquid crystal layer in the reflective state to the infrared light with the incident angle less than or equal to half of the visible angle in the anti-peek mode, is greater than the maximum of the reflectivity of the cholesteric liquid crystal layer to the visible light with the incident angle less than or equal to half of the visible angle in the anti-peek mode, and the maximum of the reflectivity of the cholesteric liquid crystal layer in the reflective state to the infrared light with the incident angle greater than half of the visible angle in the anti-peek mode, is less than the maximum of the reflectivity of the cholesteric liquid crystal layer to the visible light with the incident angle greater than half of the visible angle in the anti-peek mode; the incident angle is defined as the included angle between the incident direction and the helical axis of the cholesteric liquid crystals of the cholesteric liquid crystal layer in the reflective state, and the helical axis is parallel to the thickness direction of the cholesteric liquid crystal layer. The above-mentioned design enables transmittance of visible light emitted by the display panel with an incident angle less than or equal to half of the visible angle in the anti-peek mode in the cholesteric liquid crystal layer being in the reflective state to be greater, thereby improving brightness of pictures displayed on the display device within a range of the visible angle in the anti-peek mode, so as to ensure a display effect of the display device within the range of the visible angle in the anti-peek mode.

Moreover, transmittance of visible light emitted by the display panel with an incident angle greater than half of the visible angle in the anti-peek mode in the cholesteric liquid crystal layer being the reflective state is reduced, resulting in a decrease of brightness of the pictures displayed on the display device at a viewing angle greater than the visible angle in the anti-peek mode; moreover, combining with a greater reflectivity of visible light in the ambient light with an incident angle greater than half of the visible angle in the anti-peek mode in the cholesteric liquid crystal layer being in the reflective state, content readability can be reduced due to interference of the visible light in ambient light with the greater reflectivity to the pictures displayed on the display device at a viewing angle greater than the visible angle in the anti-peek mode, thereby achieving a four-way anti-peek effect of the display device at the viewing angle greater than the visible angle in the anti-peek mode.

Figure 6:
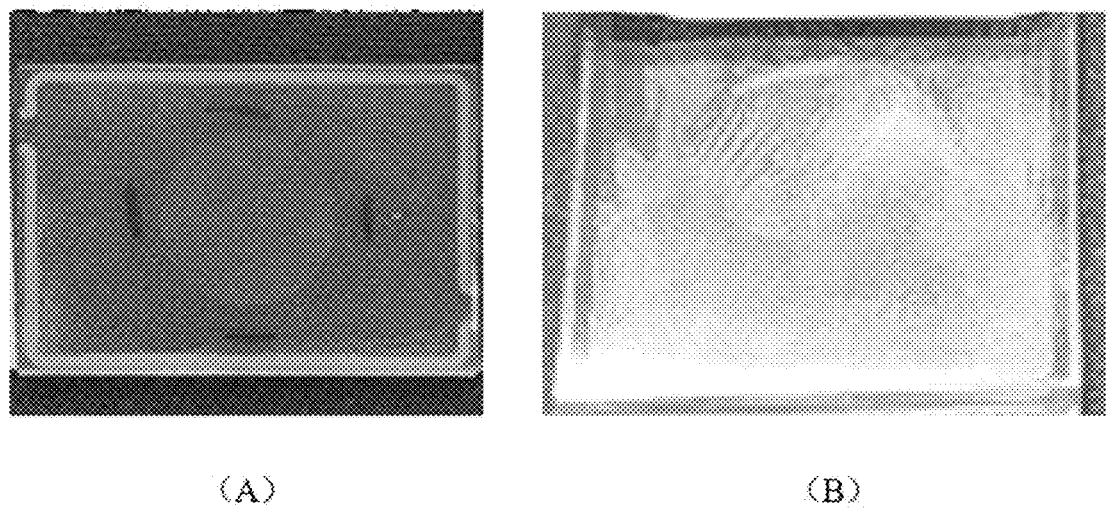

(A) of FIG. 6 illustrates a reflection effect of the display device at a viewing angle of 0 degrees when the display device is not working.

(B) of FIG. 6 illustrates a reflection effect of the display device at a viewing angle of 35 degrees when the display device is not working.

Figure 7:
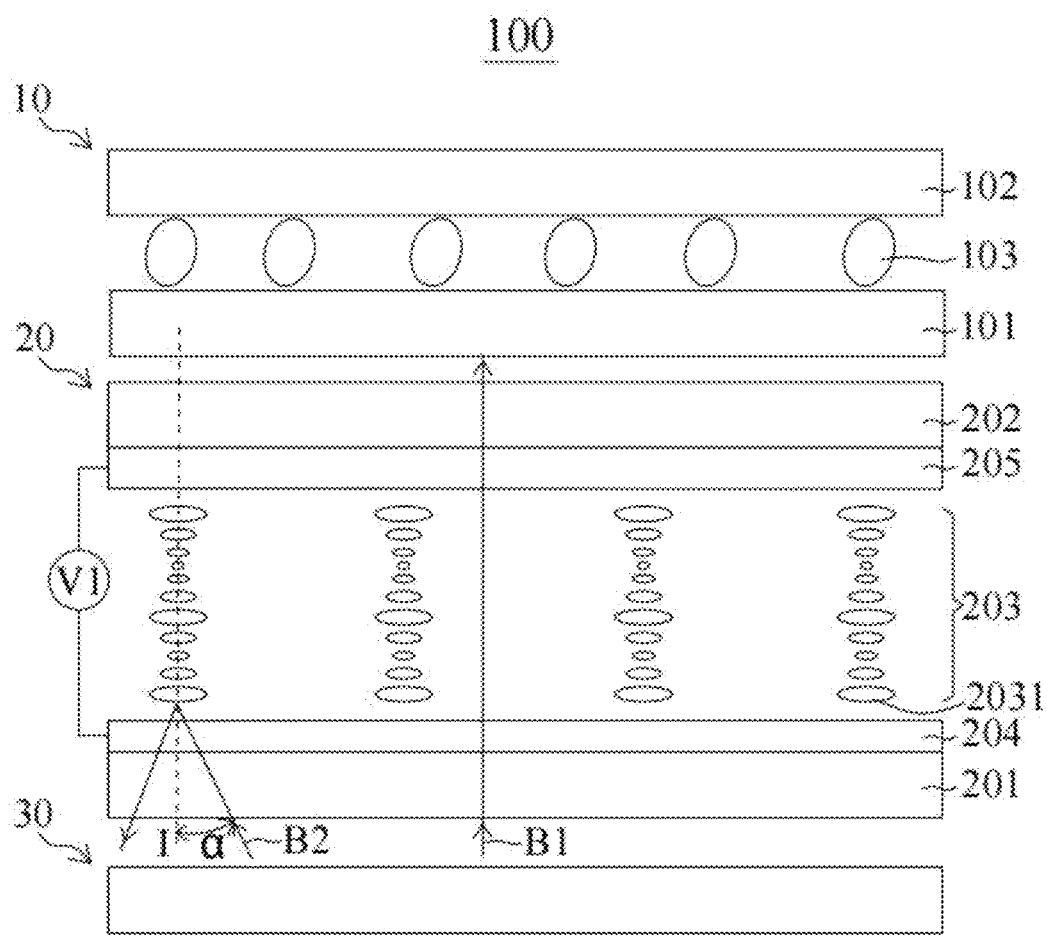

FIG. 7 is a schematic cross-sectional diagram of a display device in an anti-peek mode provided by another embodiment of the present disclosure.

Figure 8:
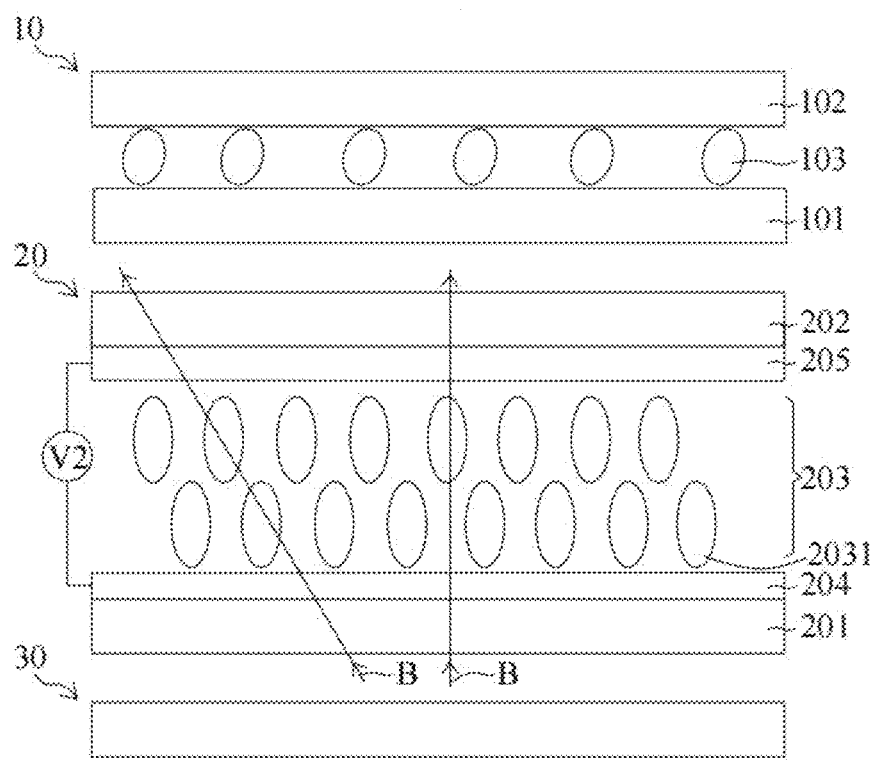

FIG. 8 is a schematic cross-sectional diagram of the display device in a sharing mode provided by another embodiment of the present disclosure.

Figure 9:
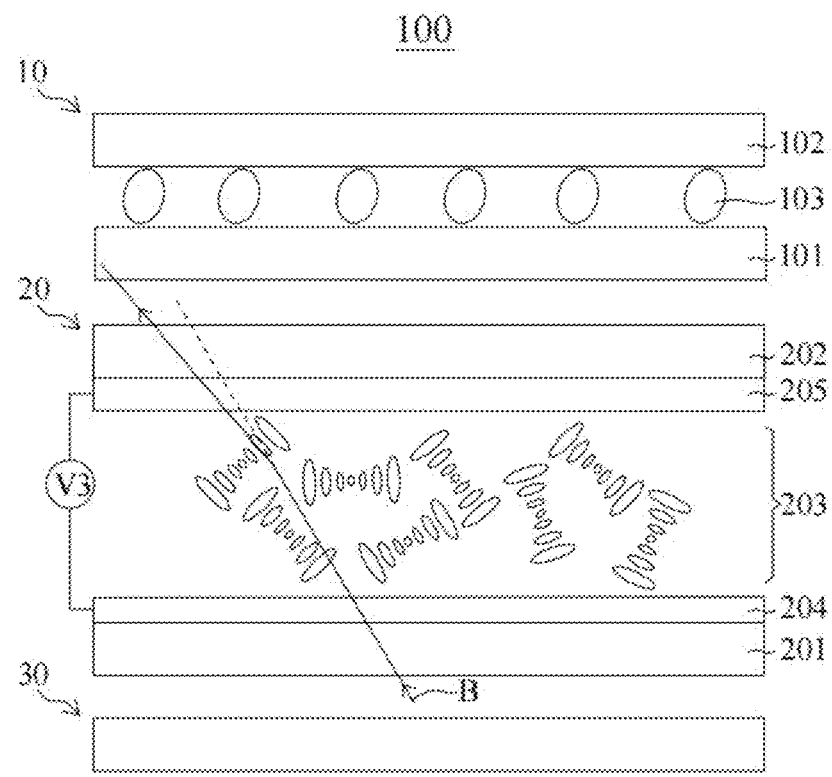

FIG. 9 is a schematic cross-sectional diagram of the display device in an enhanced sharing mode provided by another embodiment of the present disclosure.

DETAILED DESCRIPTION

In combination with drawings in the embodiments of the present disclosure, technical solutions in the embodiments of the present disclosure will be described clearly and completely. Obviously, the described embodiments are only part of the embodiments of the present disclosure, not all of them. Based on the embodiments of the present disclosure, all other embodiments obtained by those skilled in the art without creative effort belong to a scope of the present disclosure.

Figure 1:
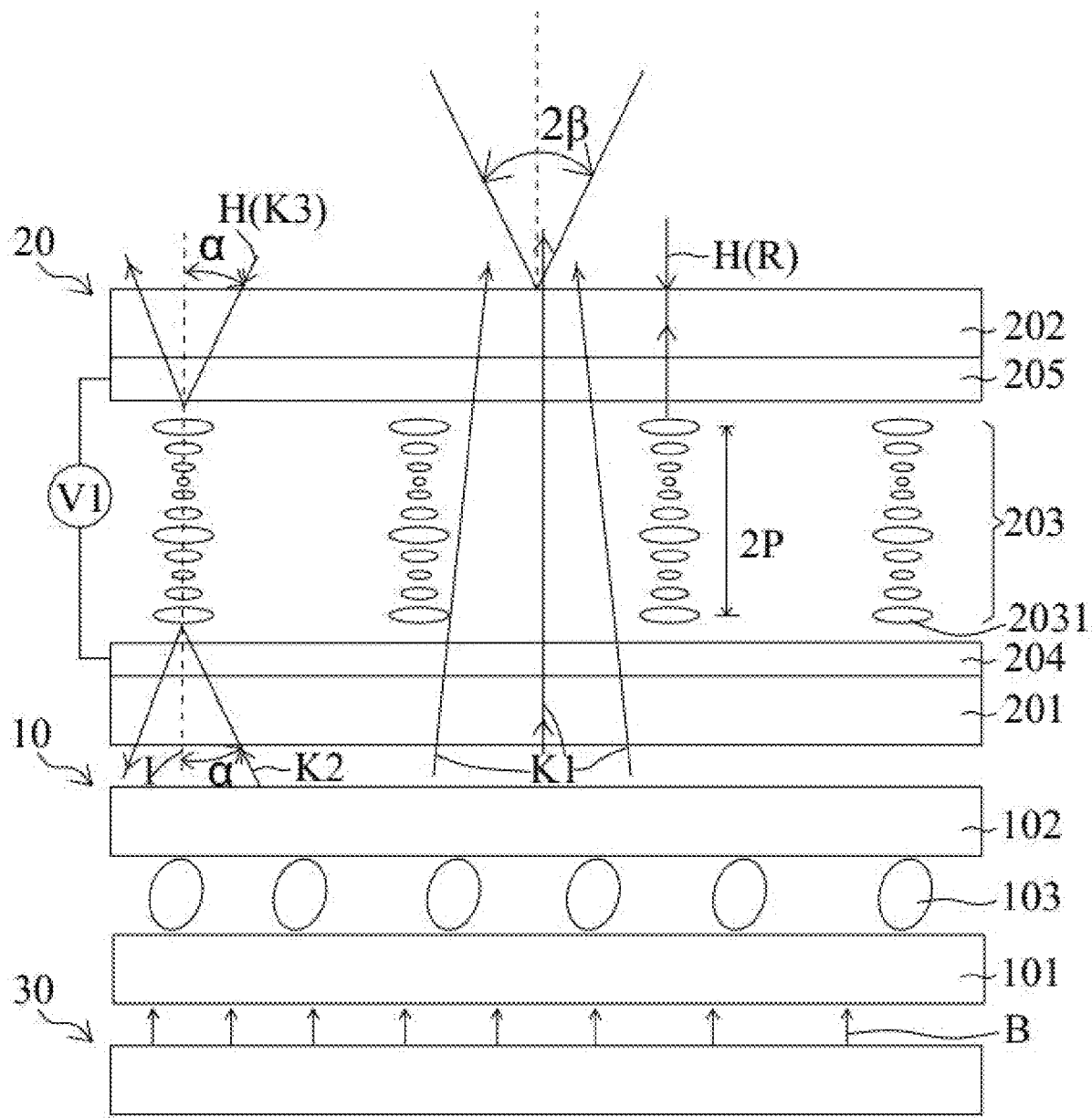
FIG. 1 is a schematic cross-sectional diagram of a display device in an anti-peek mode provided by an embodiment of the present disclosure.
Figure 2:
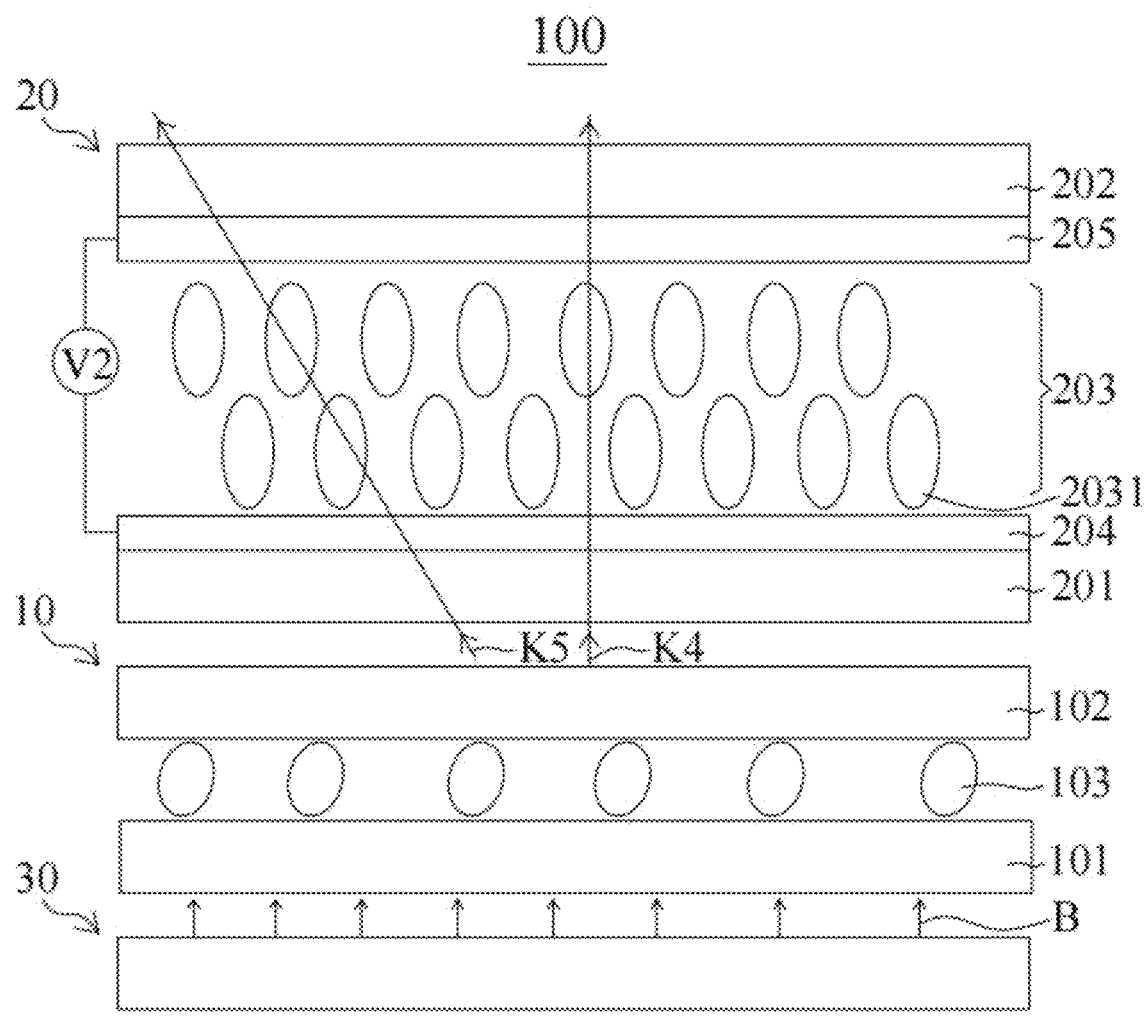
FIG. 2 is a schematic cross-sectional diagram of the display device in a sharing mode provided by the embodiment of the present disclosure.
Figure 3:
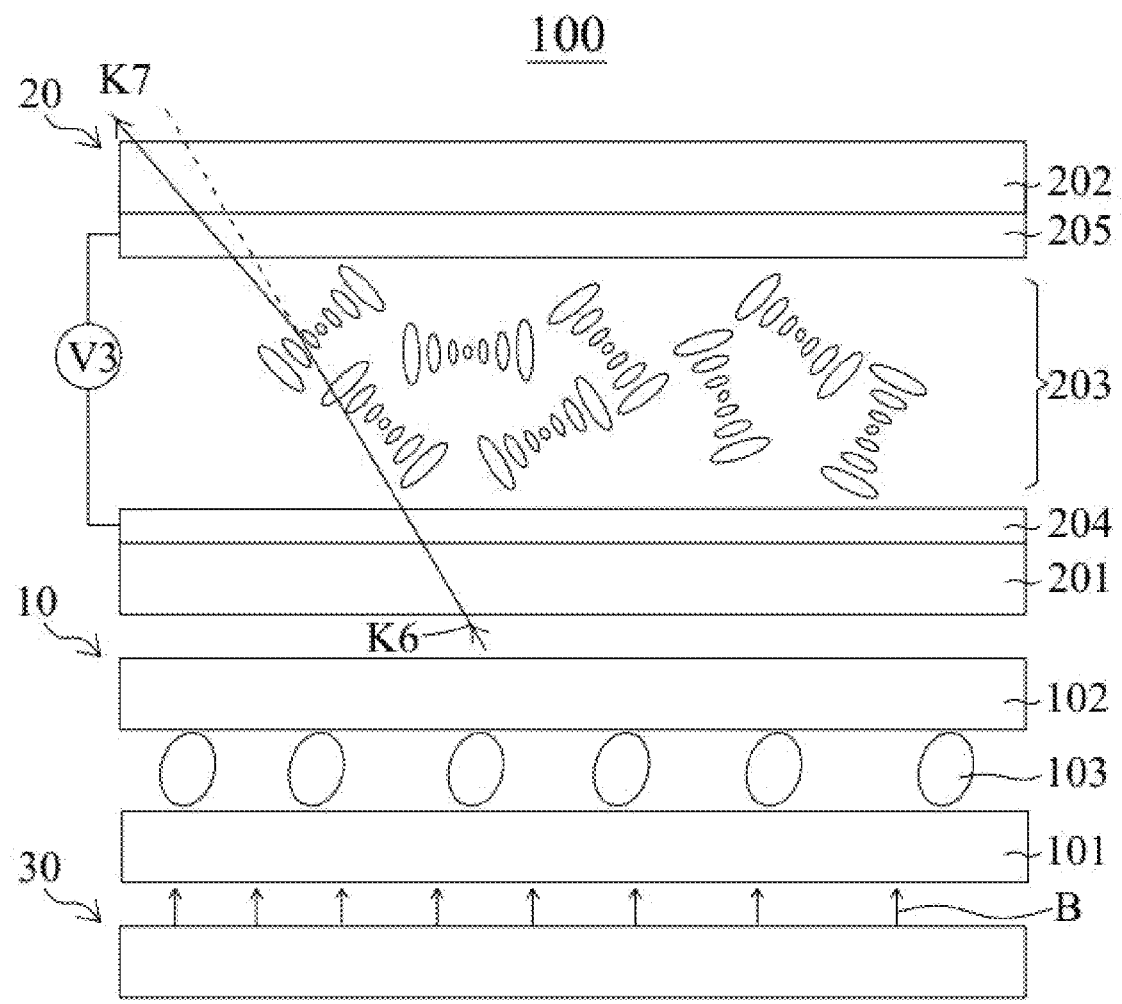
FIG. 3 is a schematic cross-sectional diagram of the display device in an enhanced sharing mode provided by the embodiment of the present disclosure.

Please refer to FIG. 1 to FIG. 3, FIG. 1 is a schematic cross-sectional diagram of a display device in an anti-peek mode provided by an embodiment of the present disclosure, FIG. 2 is a schematic cross-sectional diagram of the display device in a sharing mode provided by the embodiment of the present disclosure, and FIG. 3 is a schematic cross-sectional diagram of the display device in an enhanced sharing mode provided by the embodiment of the present disclosure.

In the embodiment, the display device 100 can be applied to a mobile phone, a tablet, a laptop, a desktop display device, a car mounted display device, etc.

In the embodiment, the display device 100 has the anti-peek mode, the sharing mode, and the enhanced sharing mode, and can be dynamically switched between the anti-peek mode, the sharing mode, and the enhanced sharing mode. The anti-peek mode is a narrow viewing mode, and the sharing mode and the enhanced sharing mode are both wide viewing sharing modes.

In the embodiment, as shown in FIG. 1, a visible angle in the anti-peek mode $2\beta$ of the display device 100 ranges between 0 degrees and 60 degrees, so as to ensure an anti-peek effect of the display device 100 at a viewing angle greater than the visible angle in the anti-peek mode, and to meet a visible angle requirement in the anti-peek mode for target users.

It can be understood that the visible angle in the anti-peek mode $2\beta$ may range between 4 degrees and 50 degrees, or the visible angle in the anti-peek mode $2\beta$ may range between 10 degrees and 40 degrees, or the visible angle in the anti-peek mode $2\beta$ may range between 16 degrees and 36 degrees, or the visible angle in the anti-peek mode $2\beta$ may range between 20 degrees and 30 degrees.

For example, the visible angle in the anti-peek mode $2\beta$ may be 60 degrees, 50 degrees, 40 degrees, 30 degrees, 20 degrees, 16 degrees, or 12 degrees.

It should be noted that the visible angle refers to an angle at which contents displayed on the display device 100 can be seen clearly. Contents displayed on the display device 100 can be seen clearly within a range of half of the visible angle in the anti-peek mode $2\beta$, and opposite two sides of a normal line of a display surface define two half of the visible angle in the anti-peek mode $2\beta$.

Half of the visible angle in the anti-peek mode $2\beta$ is defined as an angle $\beta$ ranging between 0 degrees and 30 degrees.

In the embodiment, a visible angle of the display device 100 in the sharing mode is greater than the visible angle of the display device 100 in the anti-peek mode, and a visible angle of the display device 100 in the enhanced sharing mode is greater than the visible angle of the display device 100 in the sharing mode.

In the embodiment, the display device 100 includes a display panel 10 and a dimming apparatus 20 located on a light-emitting side of the display panel 10.

The display panel 10 is a liquid crystal display panel, but is not limited to this. The display panel 10 can also be any of an organic light-emitting diode display panel, a quantum dot display panel, a micro light-emitting diode display panel, and a sub millimeter light-emitting diode display panel.

Specifically, the display panel 10 is a common liquid crystal display panel. In other words, the display panel 10 includes an array substrate 101, an opposed substrate 102, and a liquid crystal layer 103 disposed between the array substrate 101 and the opposed substrate 102. It is understood that the display panel 10 can also be a field sequence liquid crystal display panel.

The array substrate 101 may include a driving circuit and pixel electrodes connected to the driving circuit, and the opposed substrate 102 may include a color film layer and common electrodes disposed opposite to the pixel electrodes. Alternatively, the array substrate 101 may include a driving circuit, pixel electrodes, and common electrodes, the pixel electrodes are electrically connected to the driving circuit and configured to form a horizontal electric field with the common electrodes, and the opposed substrate 102 may include a color film layer. Alternatively, the array substrate 101 may include a driving circuit, pixel electrodes, common electrodes, and a color film layer, and the pixel electrodes are electrically connected to the driving circuit and configured to form a horizontal electric field with the common electrode.

As shown in FIG. 1 to FIG. 3, it should be noted that when the display panel 10 is the liquid crystal display panel, the display device 100 also includes a backlight module 30 located on a side of the display panel 10 away from the dimming apparatus 20. The backlight module 30 is configured to emit backlight B, and the backlight B can enter and emit from the display panel 10 for display. The backlight module 30 may be a direct type backlight module or an edge-lit backlight module. When the display panel 10 is the organic light-emitting diode display panel, the quantum dot display panel, the micro light-emitting diode display panel, or the sub millimeter light-emitting diode display panel, the display panel 10 may not be provided with the backlight module 30.

In the embodiment, the dimming apparatus 20 includes a first transparent substrate 201, a second transparent substrate 202, a cholesteric liquid crystal layer 203, a first electrode layer 204, and a second electrode layer 205. The first transparent substrate 201 is disposed opposite to the second transparent substrate 202, the first electrode layer 204 is disposed on a surface of the first transparent substrate 201 close to the second transparent substrate 202, the second electrode layer 205 is disposed on a surface of the second transparent substrate 202 close to the first transparent substrate 201, and the cholesteric liquid crystal layer 203 is disposed between the first electrode layer 204 and the second electrode layer 205.

The first transparent substrate 201 and the second transparent substrate 202 are both transparent glass substrates, but not limited to this. The two may also be transparent polymer substrates.

The first electrode layer 204 and the second electrode layer 205 are both transparent electrode layers, and each of the two include a transparent conductive material such as indium zinc oxide or indium tin oxide.

The cholesteric liquid crystal layer 203 includes cholesteric liquid crystals 2031 which is a mixture of nematic liquid crystals and chiral additives. When the chiral additives are left-handed chiral additives, the cholesteric liquid crystals are left-handed cholesteric liquid crystals; when the chiral additives are dextral chiral additives, the cholesteric liquid crystals are dextral cholesteric liquid crystals. The chiral additives may be selected from existing chiral additives.

An average refractive index n of the cholesteric liquid crystals 2031 satisfies a following formula: $n=(ne+2no)/3$, ne is a refractive index of the nematic liquid crystals in a long axis direction, and no is a refractive index of the nematic liquid crystals in a short axis direction. The average refractive index n of the cholesteric liquid crystals 2031 ranges between 1.5 and 1.6. For example, the average refractive index n of the cholesteric liquid crystals 2031 may be 1.51, 1.52, 1.53, 1.55, 1.57, 1.59, or 1.6.

In the embodiment, by adjusting a voltage difference between the first electrode layer 204 and the second electrode layer 205, a dynamic switching between the reflective state, a fog state, and a transparent state of the cholesteric liquid crystal layer 203 can be achieved.

In the embodiment, as shown in FIG. 1, when the display device is in the anti-peek mode, a first voltage difference V1 is defined between the first electrode layer 204 and the second electrode layer 205, and an absolute value of the first voltage difference V1 is equal to 0 V or tends to 0 V. For example, when a voltage is applied on neither the first electrode layer 204 nor the second electrode layer 205, the cholesteric liquid crystals 2031 in the cholesteric liquid crystal layer 203 is in a planar texture state without being affected by an electric field. A long axis of the cholesteric liquid crystals 2031 in each layer is parallel to a plane of a corresponding layer, and the cholesteric liquid crystals 2031 in multi-layers overlap with each other to define a spiral structure. A direction perpendicular to a plane of the cholesteric liquid crystals 2031 in each layer is defined as a helical axis I of the cholesteric liquid crystals 2031, and the helical axis I is perpendicular to the first transparent substrate 201 and the second transparent substrate 202, and parallel to a thickness direction of the cholesteric liquid crystal layer 203, so that the cholesteric liquid crystal layer 203 can be in the reflective state to selectively reflect light with different wavelengths from different incident angles.

In addition, when the cholesteric liquid crystal layer 203 is in the reflective state, the long axes of the cholesteric liquid crystals 2031 in different layers rotate at 360 degrees along the helical axis I, and then return to an initial alignment direction, a periodic pitch between each two layers is defined as a screw pitch 2P of the cholesteric liquid crystals 2031.

It should be noted that a voltage is applied on neither the first electrode layer 204 nor the second electrode layer 205, so that the display device 100 can be in the anti-peek mode when the cholesteric liquid crystal layer 203 is in the reflective state, which is beneficial to saving power consumption of the display device.

In the embodiment, when the cholesteric liquid crystal layer 203 is in the reflective state, a wavelength $\lambda$ of incident light, the average refractive index n of the cholesteric liquid crystals 2031, and an incident angle $\alpha$ of the incident light, and a half screw pitch P of the cholesteric liquid crystals 2031 satisfy a following formula: $\lambda = \lambda nP \cos \alpha$. The incident angle $\alpha$ is defined as an included angle between an incident direction of incident light and the helical axis I. In addition, a reflective bandwidth of the cholesteric liquid crystals 2031 in the reflective state satisfies a following formula: $\Delta\lambda = \Delta n\, P$, $\Delta n = ne - no$.

According to the formula $\lambda = \lambda nP \cos \alpha$, when the average refractive index n and the half screw pitch P are invariant, the wavelength $\lambda$ of incident light reflected by the cholesteric liquid crystal layer 203 in the reflective state is a maximum if the incident angle $\alpha$ is equal to 0 degrees, and the wavelength $\lambda$ of the incident light reflected by the cholesteric liquid crystal layer 203 gradually decreases during a process of increasing from 0 degrees to 90 degrees.

The cholesteric liquid crystal layer 203 has a selective reflection characteristic to incident light satisfying the formula $\lambda = \lambda nP \cos \alpha$ in the present disclosure. The half screw pitch P of the cholesteric liquid crystals can be controlled by adjusting a concentration of the chiral additives in the cholesteric liquid crystals 2031, so that the reflectivity of the cholesteric liquid crystal layer 203 to infrared light with the incident angle $\alpha$ equal to 0 degrees is a maximum; moreover, with the incident angle $\alpha$ gradually increases to 90 degrees and the wavelength $\lambda$ of incident light with a highest reflectivity gradually decreases, incident light with the incident angle $\alpha$ greater than 0 degrees and less than 90 degrees converts from infrared light to visible light due to a higher reflectivity. In other words, the cholesteric liquid crystal layer 203 reflects infrared light with an incident angle less than or equal to a specific incident angle, but has a higher transmittance for other light such as visible light, and the cholesteric liquid crystal layer 203 reflects visible light with an incident angle greater than a specific incident angle, but has a higher transmittance for other light such as infrared light.

In the embodiment, a maximum of a reflectivity of the cholesteric liquid crystal layer 203 in the reflective state to infrared light with the incident angle $\alpha$ less than or equal to half of the visible angle in the anti-peek mode $2\beta$, is greater than a maximum of a reflectivity of the cholesteric liquid crystal layer 203 to visible light with the incident angle $\alpha$ less than or equal to half of the visible angle in the anti-peek mode $2\beta$, which enables transmittance of visible light emitted by the display panel 10 with the incident angle $\alpha$ less than or equal to half of the visible angle in the anti-peek mode $2\beta$ in the cholesteric liquid crystal layer 203 being in the reflective state to be greater, thereby improving brightness of pictures displayed on the display device 100 within a range of the visible angle in the anti-peek mode $2\beta$, so as to ensure a display effect of the display device 100 within the range of the visible angle in the anti-peek mode $2\beta$.

At the same time, a maximum of a reflectivity of the cholesteric liquid crystal layer 203 in the reflective state to infrared light with the incident angle $\alpha$ greater than half of the visible angle in the anti-peek mode $2\beta$, is less than a maximum of a reflectivity of the cholesteric liquid crystal layer 203 to visible light with the incident angle $\alpha$ greater than half of the visible angle in the anti-peek mode $2\beta$, which enables transmittance of visible light emitted by the display panel 10 with the incident angle $\alpha$ greater than half of the visible angle in the anti-peek mode $2\beta$ in the cholesteric liquid crystal layer 203 being in the reflective state to be less, resulting in lower brightness of the display device 100 at a viewing angle greater than the visible angle in the anti-peek mode $2\beta$, thereby reducing content readability of the display device 100 at the viewing angle greater than the visible angle in the anti-peek mode $2\beta$, so as to achieve an anti-peek effect of the display device 100 at the viewing angle greater than the visible angle in the anti-peek mode $2\beta$. Moreover, the maximum of the reflectivity of the cholesteric liquid crystal layer 203 in the reflective state to the infrared light with the incident angle $\alpha$ greater than half of the visible angle in the anti-peek mode 2, is less than the maximum of the reflectivity of the cholesteric liquid crystal layer 203 to the visible light with the incident angle $\alpha$ greater than half of the visible angle in the anti-peek mode $2\beta$, which enables a reflectivity of visible light in the ambient light at the incident angle $\alpha$ greater than half of the visible angle in the anti-peek mode $2\beta$ in the cholesteric liquid crystal layer being in the reflective state to be greater, therefore, the content readability can further be reduced due to interference of the reflected visible light in ambient light to visible light emitted by the display device 10, thereby further improving a four-way anti-peek effect of the display device 100 at the viewing angle greater than the visible angle in the anti-peek mode $2\beta$.

Figure 4:
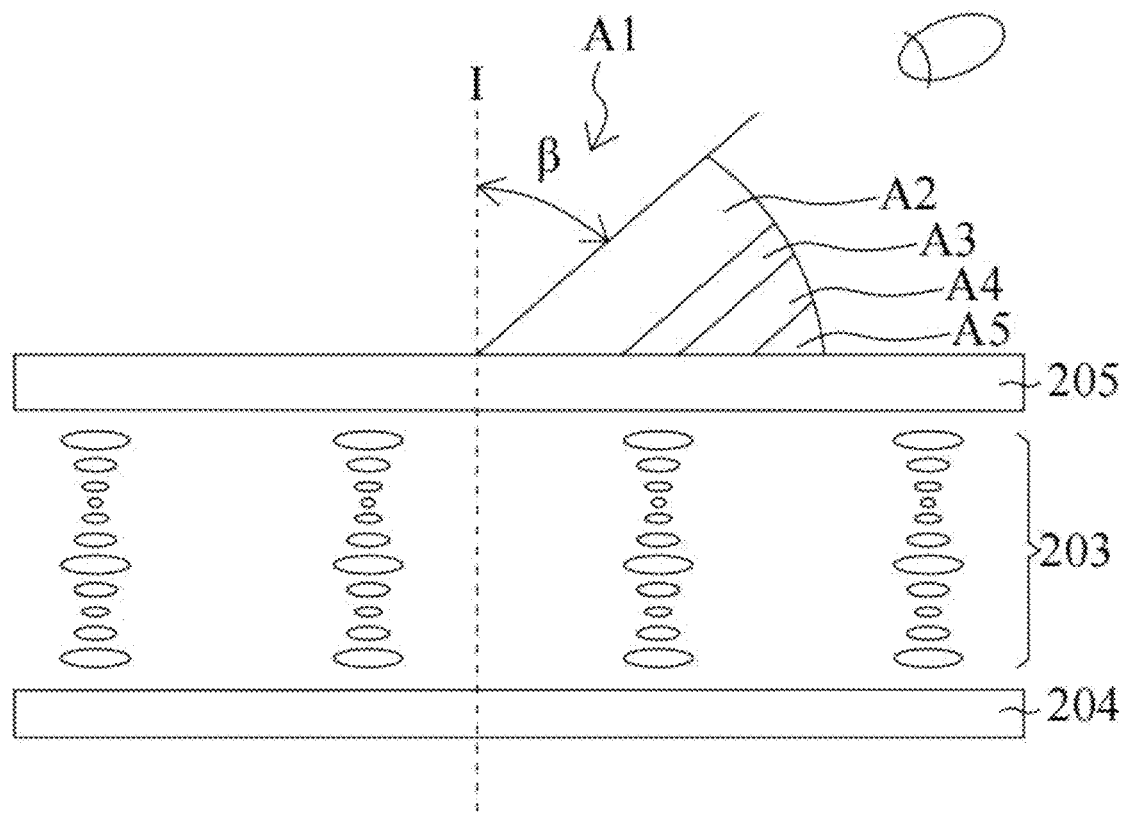
FIG. 4 is a schematic diagram of a cholesteric liquid crystal layer reflecting incident light in a reflective state.

As shown in FIG. 4, and FIG. 4 is a schematic diagram of the cholesteric liquid crystal layer reflecting incident light in the reflective state. When the cholesteric liquid crystal layer 203 is in the reflective state, if the incident angle $\alpha$ of incident light ranges between 0 degrees and half of the visible angle in the anti-peek mode $2\beta$, a maximum of a reflectivity of the cholesteric liquid crystal layer 203 to infrared light in the incident light is greater than a maximum of a reflectivity of the cholesteric liquid crystal layer 203 to visible light in the incident light; in other words, an area the above-mentioned incident light entering is an infrared reflection area A1 at which infrared light is mainly reflected. Correspondingly, when the incident angle α of incident light ranges between half of the visible angle in the anti-peek mode 2 and 90 degrees, a maximum of a reflectivity of the cholesteric liquid crystal layer 203 to visible light in the incident light is greater than a maximum of a reflectivity of the cholesteric liquid crystal layer 203 to infrared light in the incident light; in other words, an area the above-mentioned incident light entering is a visible light reflection area at which visible light is mainly reflected.

The visible light reflection area includes a red light reflection area A2, a yellow light reflection area A3, a green light reflection area A4, and a blue light reflection area A5 adjacent to each other in sequence. The red light reflection area A2 is adjacent to the infrared reflection area A1. A range of an incident angle of incident light entering the red light reflection area A2 is greater than a range of an incident angle of incident light entering the green light reflection area A4. The range of the incident angle of incident light entering the green light reflection area A4 is greater than a range of an incident angle of incident light entering the blue light reflection area A5. A maximum of a reflectivity of the cholesteric liquid crystal layer 203 in the reflective state to red light entering the red light reflection region A2 is greater than a maximum of a reflectivity of the cholesteric liquid crystal layer 203 to other light entering the red light reflection region A2. A maximum of a reflectivity of the cholesteric liquid crystal layer 203 in the reflective state to yellow light entering the yellow light reflection area A3 is greater than a maximum of a reflectivity of the cholesteric liquid crystal layer 203 to other light entering the yellow light reflection area A3. A maximum of a reflectivity of the cholesteric liquid crystal layer 203 in the reflective state to green light entering the green light reflection area A4 is greater than a maximum of a reflectivity of the cholesteric liquid crystal layer 203 to other light entering the green light reflection area A4. A maximum of the reflectivity of the cholesteric liquid crystal layer 203 in the reflective state to blue light entering the blue light reflection area A5 is greater than a maximum of a reflectivity of the cholesteric liquid crystal layer 203 to other light entering the blue light reflection area A5.

As shown in FIG. 1, when the dimming apparatus 20 is located on the light-emitting side of the display panel 10, visible light emitted by the display panel 10 and entering with the incident angle α ranging between 0 degrees and half of the visible angle in the anti-peek mode 2β is defined as first visible light K1, the first visible light K1 10 can pass through the cholesteric liquid crystal layer 203, so as to ensure brightness of pictures displayed on the display device 100 within the range of the visible angle in the anti-peek mode 2β, thereby ensuring the display effect of the display device 100 within the range of the visible angle in the anti-peek mode 2β.

At the same time, visible light emitted by the display panel 10 and entering with the incident angle α being greater than half of the visible angle in the anti-peek mode 2β is defined as second visible light K2, the second visible light K2 is reflected by the cholesteric liquid crystal layer 203, resulting in dark display pictures caused by lower brightness of pictures displayed on the display device at the viewing angle greater than half of the visible angle in the anti-peek mode 2β in an off-axis direction, thereby achieving the anti-peek effect at the viewing angle greater than the visible angle in the anti-peek mode 2β. Moreover, infrared light in the ambient light with the incident angle α ranging between 0 degrees and half of the visible angle in the anti-peek mode 2β is defined as infrared light H (R), the infrared light H (R) is reflected but does not affect the display effect of the display device 100. Visible light in the ambient light with the incident angle being greater than half of the visible angle in the anti-peek mode 2β is defined as third visible light H (K3), and the third visible light H (K3) is reflected and thus interferes with visible light emitted by the display panel 10, which further reduces readability of display pictures at the viewing angle greater than half of the visible angle in the anti-peek mode 2β in the off-axis direction, thereby further improving the anti-peek effect at the viewing angle greater than the visible angle in the anti-peek mode 2β.

In the display device of the present disclosure, the maximum of the reflectivity of the cholesteric liquid crystal layer in the reflective state to the infrared light with the incident angle less than or equal to half of the visible angle in the anti-peek mode, is greater than the maximum of the reflectivity of the cholesteric liquid crystal layer to the visible light with the incident angle less than or equal to half of the visible angle in the anti-peek mode, and the maximum of the reflectivity of the cholesteric liquid crystal layer in the reflective state to the infrared light with the incident angle greater than half of the visible angle in the anti-peek mode, is less than the maximum of the reflectivity of the cholesteric liquid crystal layer to the visible light with the incident angle greater than half of the visible angle in the anti-peek mode; the incident angle is defined as the included angle between the incident direction and the helical axis of the cholesteric liquid crystals of the cholesteric liquid crystal layer in the reflective state, and the helical axis is parallel to the thickness direction of the cholesteric liquid crystal layer. The above-mentioned design enables transmittance of visible light emitted by the display panel with an incident angle less than or equal to half of the visible angle in the anti-peek mode in the cholesteric liquid crystal layer being in the reflective state to be greater, thereby improving brightness of pictures displayed on the display device within a range of the visible angle in the anti-peek mode, so as to ensure a display effect of the display device within the range of the visible angle in the anti-peek mode.

Moreover, transmittance of visible light emitted by the display panel with an incident angle greater than half of the visible angle in the anti-peek mode in the cholesteric liquid crystal layer being the reflective state is reduced, resulting in a decrease of brightness of the pictures displayed on the display device at a viewing angle greater than the visible angle in the anti-peek mode; moreover, combining with a greater reflectivity of visible light in the ambient light with an incident angle greater than half of the visible angle in the anti-peek mode in the cholesteric liquid crystal layer being in the reflective state, content readability can be reduced due to interference of the visible light in ambient light with the greater reflectivity to the pictures displayed on the display device at a viewing angle greater than the visible angle in the anti-peek mode, thereby achieving a four-way anti-peek effect of the display device at the viewing angle greater than the visible angle in the anti-peek mode.

It should be noted that when the display device 100 is in the anti-peek mode, the maximum of the reflectivity of the cholesteric liquid crystal layer 203 in the reflective state to visible light with the incident angle less than or equal to half of the visible angle in the anti-peek mode 2β is less than or equal to 30%, which can ensure visibility of pictures displayed on the display device 100 within the range of the visible angle in the anti-peek mode 2β. In addition, when the display device 100 is in the anti-peek mode, the maximum of the reflectivity of the cholesteric liquid crystal layer 203 in the reflective state to visible light with the incident angle greater than half of the visible angle in the anti-peek mode 2β is greater than 30% and less than or equal to 50%, which can ensure invisibility of pictures displayed on the display device 100 at the viewing angle greater than the visible angle in the anti-peek mode 2β.

Further, the maximum of the reflectivity of the cholesteric liquid crystal layer 203 in the reflective state to visible light with the incident angle α less than or equal to half of the visible angle in the anti-peek mode 2β is less than or equal to 15%, so as to further ensure a higher transmittance of the cholesteric liquid crystal layer 203 in the reflective state to visible light, thereby further improving the display effect of the display device within the range of the visible angle in the anti-peek mode.

It can be understood that the maximum of the reflectivity of the cholesteric liquid crystal layer 203 in the reflective state to visible light with the incident angle α less than or equal to half of the visible angle in the anti-peek mode 2β may be less than or equal to 12% or 8%.

For example, the maximum of the reflectivity of the cholesteric liquid crystal layer 203 in the reflective state to visible light with the incident angle α less than or equal to half of the visible angle in the anti-peek mode 2β is 15%, 12%, 10%, 8%, 6%, or 4%.

In the embodiment, the reflectivity of the cholesteric liquid crystal layer 203 in the reflective state to infrared light perpendicularly entering the cholesteric liquid crystal layer 203 with a wavelength ranging between 760 nm and 900 nm is a maximum. At the same time, the reflective bandwidth of the cholesteric liquid crystal layer 203 in the reflective state ranges between 100 nm and 150 nm, and a reflectivity of infrared light perpendicularly entering the above-mentioned cholesteric liquid crystal layer 203 is greater than and equal to 25%.

In the embodiment, the screw pitch 2P of the cholesteric liquid crystal 2031 in the reflective state ranges between 460 nm and 600 nm, so that the reflectivity of the cholesteric liquid crystal layer 203 in the reflective state to infrared light perpendicularly entering the cholesteric liquid crystal layer 203 is the maximum, and a wavelength of the above-mentioned infrared light ranges between 760 nm and 900 nm.

It can be understood that the screw pitch 2P of the cholesteric liquid crystal 2031 in the reflective state ranges between 475 nm and 600 nm, or the screw pitch 2P of the cholesteric liquid crystal 2031 in the reflective state ranges between 500 nm and 580 nm, or the screw pitch 2P of the cholesteric liquid crystal 2031 in the reflective state ranges between 520 nm and 560 nm.

In the embodiment, the cholesteric liquid crystals 2031 includes chiral additives ranging between 10% and 15% by weight, and nematic liquid crystals ranging between 85% and 90% by weight, so that the screw pitch 2P of the cholesteric liquid crystals 2031 in the reflective state can be designed to range between 460 nm and 600 nm.

Figure 5:
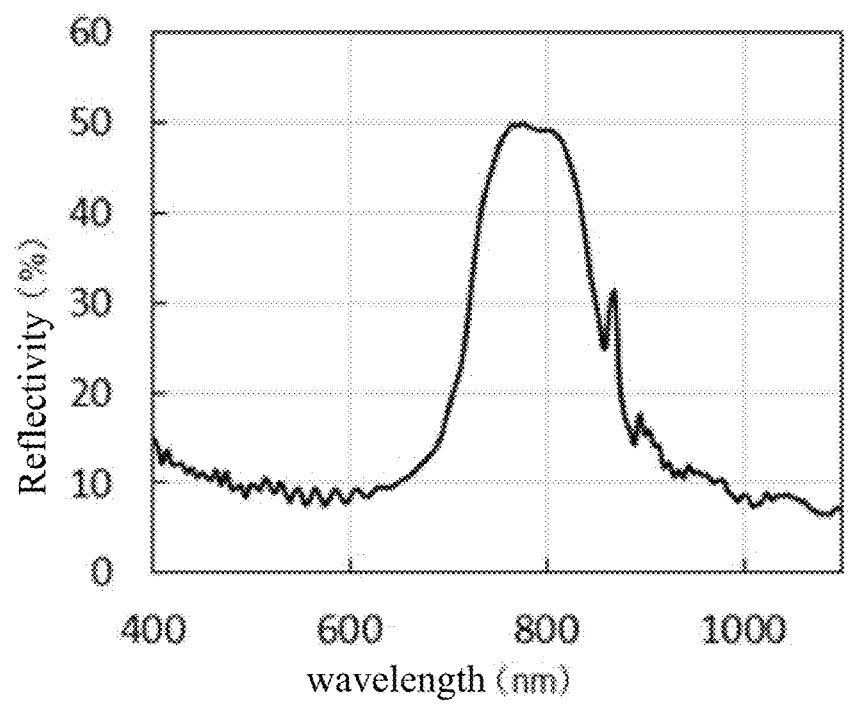
FIG. 5 is a reflection spectrum diagram of cholesteric liquid crystals under irradiation of a light source D65, the cholesteric liquid crystals include 11% of chiral additives and 89% of nematic liquid crystals by weight, an average refractive index of the cholesteric liquid crystals 2031 is 1.57, and a screw pitch 2P of the cholesteric liquid crystals 2031 is 509 nm.

Specifically, please refer to FIG. 5. FIG. 5 is a reflection spectrum of the cholesteric liquid crystal layer 203 under irradiation of a light source D65, the cholesteric liquid crystals 2031 in the cholesteric liquid crystal layer 203 include 11% of chiral additives and 89% of nematic liquid crystals by weight; an average refractive index of the cholesteric liquid crystals 2031 is 1.57, and the screw pitch 2P of the cholesteric liquid crystals 2031 is 509 nm. As shown in FIG. 5, the maximum of the reflectivity of the cholesteric liquid crystal layer 203 in the reflective state to infrared light perpendicularly entering the cholesteric liquid crystal layer 203 is 49.2%, wherein a wavelength of the infrared light is 800 nm; at the same time, the reflective bandwidth of the cholesteric liquid crystal layer 203 to the above-mentioned infrared light with the reflectivity being greater than and equal to 25% is 130 nm.

In the embodiment, a reflectivity of the cholesteric liquid crystal layer 203 in the reflective state to green light with the incident angle α greater than half of the visible angle in the anti-peek mode 2β, is greater than a reflectivity of the cholesteric liquid crystal layer 203 to blue light with the incident angle α greater than half of the visible angle in the anti-peek mode 2β.

Due to a fact that green light can be more easily recognized by human eye compared with blue light, a reflection effect of the liquid crystal layer 203 on green light is better than a reflection effect on blue light. Therefore, by designing the reflectivity of the cholesteric liquid crystal layer 203 in the reflective state to green light with the incident angle greater than half of the visible angle in the anti-peek mode 2β being greater than the reflectivity of the cholesteric liquid crystal layer 203 to blue light with the incident angle α greater than half of the visible angle in the anti-peek mode 2β, the reflectivity of the cholesteric liquid crystal layer 203 to green light can be improved, thereby ensuring a better anti-peek effect of the display device 100 at the viewing angle greater than the visible angle in the anti-peek mode 2β in the anti-peek mode.

In the embodiment, the maximum of the reflectivity of the cholesteric liquid crystal layer 203 in the reflective state to green light with the incident angle α greater than half of the visible angle in the anti-peek mode 2β is greater than 40% and less than 50%, so that the reflectivity of the cholesteric liquid crystal layer 203 in the reflective state to green light with the incident angle α greater than half of the visible angle in the anti-peek mode 2β is greater.

In the embodiment, a reflectivity of the cholesteric liquid crystal layer 203 in the reflective state to red light with the incident angle α greater than half of the visible angle in the anti-peek mode 2β, is greater than a reflectivity of the cholesteric liquid crystal layer 203 to blue light with the incident angle α greater than half of the visible angle in the anti-peek mode 2β.

Please refer to (A) and (B) of FIG. 6. (A) of FIG. 6 illustrates a reflection effect of the display device at a viewing angle of 0 degrees when the display device is not working, and (B) of FIG. 6 illustrates a reflection effect of the display device at a viewing angle of 35 degrees when the display device is not working.

As shown in (A) of FIG. 6, at a viewing angle of 0 degrees that is in a positive viewing angle direction of the display device 100, due to a fact that infrared light in ambient light vertically entering the dimming apparatus 20 is reflected by the dimming apparatus 20, while visible light in the ambient light vertically entering the dimming apparatus 20 passes through the dimming apparatus 20, the display device 100 is transparent.

As shown in (B) of FIG. 6, due to a fact that the dimming apparatus 20 reflects infrared light in ambient light at a viewing angle of 35 degrees, while visible light in ambient light at the viewing angle of 35 degrees passes through the dimming device 20, the display device 100 reflects red light at the viewing angle of 35 degrees.

In the embodiment, when the display device 100 is in the sharing mode, a second voltage difference V2 is defined between the first electrode layer 204 and the second electrode layer 205, and an absolute value of the second voltage difference V2 is greater than an absolute value of the first voltage difference V1. For example, when the absolute value of the second voltage difference V2 ranges between 15 V and 20 V, the second voltage difference V2 is large enough so that an electric field applied to the cholesteric liquid crystals 2031 is sufficiently large. At this situation, the cholesteric liquid crystals 2031 are arranged along an electric field direction, the cholesteric liquid crystal layer 203 is in a transparent state, and a selective reflection characteristic of the cholesteric liquid crystal layer 203 in the transparent state disappears, the cholesteric liquid crystal layer 203 is transparent from all viewing directions, and transmittance of the cholesteric liquid crystal layer 203 in the transparent state to visible light is greater than or equal to 85%, and a haze is less than or equal to 4%.

As shown in FIG. 2, when the display device 100 is in the sharing mode, the cholesteric liquid crystal layer 203 is in the transparent state, a direction of fourth visible light K4 emitted by the display panel 10 is parallel to the thickness direction of the cholesteric liquid crystal layer 203, a direction of fifth visible light K5 emitted by the display panel 10 intersects the thickness direction of the cholesteric liquid crystal layer 203, and both the fourth visible light K4 and the fifth visible light K5 pass through the cholesteric liquid crystal layer 203, making transmittance of visible light emitted by the display panel 10 in the cholesteric liquid crystal layer 203 higher, so that the display device 100 has a good display effect at both a positive viewing angle of 0 degrees and an off axis angle greater than 0 degrees, and a visible angle of the display device 100 in the sharing mode is greater than a visible angle of the display device 100 in the anti-peek mode.

In the embodiment, when the display device 100 is in the enhanced sharing mode, a third voltage difference V3 is defined between the first electrode layer 204 and the second electrode layer 205, an absolute value of the third voltage difference V3 is greater than the absolute value of the first voltage difference V1 and less than the absolute value of the second voltage difference V2. For example, when the absolute value of the third voltage difference V3 ranges between 10 V and 15 V, the cholesteric liquid crystals 2031 are in a focal cone state, and helical axes of the cholesteric liquid crystals 2031 are parallel to the first transparent substrate 201 and the second transparent substrate 202; the cholesteric liquid crystal layer 203 is in a fog state, and a haze of the cholesteric liquid crystal layer 203 in the fog state is greater than or equal to 60%, so that incident light can be scattered by the cholesteric liquid crystal layer 203 in the fog state.

As shown in FIG. 3, when the display device 100 is in the enhanced sharing mode, sixth visible light K6 emitted by the display panel 10 enters and is scattered by the cholesteric liquid crystal layer 203 to concert into seventh visible light K7. An exit angle of the seventh visible light K7 is greater than an exit angle of the sixth visible light K6, making the visible angle of the display device 100 in the enhanced sharing mode greater than the visible angle of the display device 100 in the sharing mode. The enhanced sharing mode is an enhanced sharing state.

It should be noted that the focal cone state of the cholesteric liquid crystal 2031 is a stable state. It is possible to maintain the cholesteric liquid crystal 2031 in the focal cone state without continuously applying the third voltage difference, thereby maintaining the fog state of the cholesteric liquid crystal layer 203. In addition, when a voltage difference between the first electrode layer 204 and the second electrode layer 205 is between the first voltage difference and the third voltage difference, the cholesteric liquid crystals 2031 of the cholesteric liquid crystal 2031 is in a mixed state of a planar state and the focal cone state. As the voltage difference increases, a proportion of the cholesteric liquid crystals 2031 in the focal cone state increases, and when the voltage difference is equal to the third voltage difference, the cholesteric liquid crystals 2031 are completely in the focal cone state.

In the embodiment, during an increasing process of the voltage difference applied to the cholesteric liquid crystals from the first voltage difference to the third voltage difference, and then to the second voltage difference, the cholesteric liquid crystal layer is switched from the reflective state to the fog state, and then to the transparent state. Correspondingly, the display device is switched from the anti-peek mode at a narrow viewing angle to the enhanced sharing mode, and then to the sharing mode, enabling the display device to achieve dynamic four-way anti-peek function.

Please refer to FIG. 7 to FIG. 9. FIG. 7 is a schematic cross-sectional diagram of a display device in the anti-peek mode provided by an another embodiment of the present disclosure, FIG. 8 is a schematic cross-sectional diagram of the display device in the sharing mode provided by another embodiment of the present disclosure, and FIG. 9 is a schematic cross-sectional diagram of the display device in the enhanced sharing mode provided by another embodiment of the present disclosure.

The display devices 100 shown in FIG. 7 to FIG. 9 are basically similar to the display devices 100 shown in FIG. 1 to FIG. 3, and similarities will not be repeated. Differences include that the dimming apparatus 20 is located between the backlight module 30 and the display panel 10, and the cholesteric liquid crystal layer 203 of the dimming apparatus 20 is only configured to adjust backlight B emitted by the backlight module 30.

As shown in FIG. 7, when the display device 100 is in the anti-peek mode, while first backlight B1 emitted by the backlight module 30 with the incident angle α less than or equal to half of the visible angle in the anti-peek mode 2β is transmitted by the cholesteric liquid crystal layer 203 in the reflective state, second backlight B2 emitted by the backlight module 30 with the incident angle α greater than half of the visible angle in the anti-peek mode 2β is reflected by the cholesteric liquid crystal layer 203 in the reflective state, so that the first backlight B1 can emit from the display panel 10 to ensure brightness of the display device 100 within the range of the visible angle in the anti-peek mode 2; at a same time, the second backlight B2 can not enter the display panel 10, thereby reducing brightness of the display device 100 at the viewing angle greater than the visible angle in the anti-peek mode 2β, resulting in lower brightness of display pictures at the viewing angle greater than the visible angle in the anti-peek mode 2β, which can ensure that the display device 100 can be in the anti-peek mode at a narrow viewing angle.

It should be noted that a design of the dimming apparatus 20 in FIG. 1 located at the light-emitting side of the display panel 10 is also applicable to a design of the dimming apparatus 20 located between the backlight module 30 and the display panel 10, and will not be repeated here.

As shown in FIG. 8, when the display device 100 is in the sharing mode, the backlight B emitted by the backlight module 30 can enter the display panel 10 without interference of the cholesteric liquid crystal layer 203. The display device 100 has good display effects at both a positive viewing angle of 0 degrees and an off-axis angle greater than 0 degrees. A visible angle of the display device 100 in the sharing mode is greater than a visible angle of the display device 100 in the anti-peek mode.

As shown in FIG. 9, when the display device 100 is in the enhanced sharing mode, the backlight B emitted by the backlight module 30 is scattered by the cholesteric liquid crystal layer 203 in the fog state, and the scattered backlight B enters and emits from the display panel 10, which can increase an exit angle of visible light emitted by the display panel 10, so that the visible angle of the display device 100 in the enhanced sharing mode can be designed to be greater than the visible angle of the display device 100 in the sharing mode.

It can be understood that when the display panel 10 is a liquid crystal display panel, two dimming apparatuses 20 can be simultaneously disposed on the light-emitting side and a light incident side of the display panel 10, respectively, so as to achieve a better anti-peek effect when the display device 100 is in the anti-peek mode.

Description of the above-mentioned embodiments is only used to help understand technical solutions and a core idea of the present disclosure. Those skilled in the art should understand that they can still modify the technical solutions recorded in the aforementioned embodiments, or equivalently replace some of technical features therein. Modifications or substitutions do not detract from a nature of the corresponding technical solutions from a scope of the technical solutions of the embodiments of the present disclosure.

What is claimed is:

1. A display device, operable in an anti-peek mode, comprising:
   a display panel; and
   a dimming apparatus, located on a light-emitting side of the display panel, wherein the dimming apparatus comprises a cholesteric liquid crystal layer which comprises cholesteric liquid crystals operable in a reflective state;
   wherein upon a condition that the cholesteric liquid crystal layer is in the reflective state while the display device is in the anti-peek mode, a maximum of a reflectivity of the cholesteric liquid crystal layer in the reflective state to infrared light with an incident angle less than or equal to half of a visible angle in the anti-peek mode, is greater than a maximum of a reflectivity of the cholesteric liquid crystal layer to visible light with an incident angle less than or equal to half of the visible angle in the anti-peek mode; and a maximum of a reflectivity of the cholesteric liquid crystal layer in the reflective state to infrared light with an incident angle greater than half of the visible angle in the anti-peek mode, is less than a maximum of a reflectivity of the cholesteric liquid crystal layer to visible light with an incident angle greater than half of the visible angle in the anti-peek mode, where the incident angle is defined as an included angle between an incident direction and a helical axis of the cholesteric liquid crystals of the cholesteric liquid crystal layer in the reflective state, and the helical axis is parallel to a thickness direction of the cholesteric liquid crystal layer.

2. The display device of claim 1, wherein half of the visible angle in the anti-peek mode ranges between 0 degrees and 30 degrees.

3. The display device of claim 1, wherein the maximum of the reflectivity of the cholesteric liquid crystal layer in the reflective state to the visible light with the incident angle less than or equal to half of the visible angle in the anti-peek mode is less than or equal to 15%.

4. The display device of claim 1, wherein the reflectivity of the cholesteric liquid crystal layer in the reflective state to infrared light perpendicularly entering the cholesteric liquid crystal layer with a wavelength ranging between 760 nm and 900 nm is a maximum.

5. The display device of claim 4, wherein a screw pitch of the cholesteric liquid crystals in the reflective state ranges between 460 nm and 600 nm.

6. The display device of claim 5, wherein the cholesteric liquid crystals comprise chiral additives ranging between 10% and 15% by weight.

7. The display device of claim 1, wherein a reflectivity of the cholesteric liquid crystal layer in the reflective state to green light with an incident angle greater than half of the visible angle in the anti-peek mode, is greater than a reflectivity of the cholesteric liquid crystal layer to blue light with an incident angle greater than half of the visible angle in the anti-peek mode.

8. The display device of claim 1, further operable in a sharing mode, wherein the cholesteric liquid crystal layer further has a transparent state; and
   wherein the cholesteric liquid crystal layer is in the transparent state when the display device is in the sharing mode.

9. The display device of claim 8, further operable in an enhanced sharing mode, wherein the cholesteric liquid crystal layer further has a fog state; and
   wherein the cholesteric liquid crystal layer is in the fog state when the display device is in the enhanced sharing mode.

10. The display device of claim 9, wherein the cholesteric liquid crystal layer is located between a first electrode layer and a second electrode layer of the dimming apparatus;
    when the cholesteric liquid crystal layer is in the reflective state, a first voltage difference is defined between the first electrode layer and the second electrode layer;
    when the cholesteric liquid crystal layer is in the transparent state, a second voltage difference is defined between the first electrode layer and the second electrode layer;
    when the cholesteric liquid crystal layer is in the fog state, a third voltage difference is defined between the first electrode layer and the second electrode layer; and
    wherein an absolute value of the first voltage difference is less than an absolute value of the third voltage difference, and the absolute value of the third voltage difference is less than an absolute value of the second voltage difference.

11. A display device, operable in an anti-peek mode, wherein the display device comprises a liquid crystal display panel and a dimming apparatus located on a light-emitting side of the liquid crystal display panel, and the dimming apparatus comprises:
    a cholesteric liquid crystal layer, comprising cholesteric liquid crystals operable in a reflective state;
    wherein upon a condition that the cholesteric liquid crystal layer is in the reflective state while the display device is in the anti-peek mode, a maximum of a reflectivity of the cholesteric liquid crystal layer in the reflective state to infrared light with an incident angle less than or equal to half of a visible angle in the anti-peek mode, is greater than a maximum of a reflectivity of the cholesteric liquid crystal layer to visible light with an incident angle less than or equal to half of the visible angle in the anti-peek mode; and a maximum of a reflectivity of the cholesteric liquid crystal layer in the reflective state to infrared light with an incident angle greater than half of the visible angle in the anti-peek mode, is less than a maximum of a reflectivity of the cholesteric liquid crystal layer to visible light with an incident angle greater than half of the visible angle in the anti-peek mode, where the incident angle is defined as an included angle between an incident direction and a helical axis of the cholesteric liquid crystals of the cholesteric liquid crystal layer in the reflective state, and the helical axis is parallel to a thickness direction of the cholesteric liquid crystal layer.

12. The display device of claim 11, further comprising a backlight module configured to emit backlight, wherein the dimming apparatus is located between the liquid crystal display panel and the backlight module.

13. The display device of claim 11, wherein half of the visible angle in the anti-peek mode ranges between 0 degrees and 30 degrees.

14. The display device of claim 11, wherein the maximum of the reflectivity of the cholesteric liquid crystal layer in the reflective state to the visible light with the incident angle less than or equal to half of the visible angle in the anti-peek mode is less than or equal to 15%.

15. The display device of claim 11, wherein the reflectivity of the cholesteric liquid crystal layer in the reflective state to infrared light perpendicularly entering the cholesteric liquid crystal layer with a wavelength ranging between 760 nm and 900 nm is a maximum.

16. The display device of claim 15, wherein a screw pitch of the cholesteric liquid crystals in the reflective state ranges between 460 nm and 600 nm.

17. The display device of claim 16, wherein the cholesteric liquid crystals comprise chiral additives ranging between 10% and 15% by weight.

18. The display device of claim 11, wherein a reflectivity of the cholesteric liquid crystal layer in the reflective state to green light with an incident angle greater than half of the visible angle in the anti-peek mode, is greater than a reflectivity of the cholesteric liquid crystal layer to blue light with an incident angle greater than half of the visible angle in the anti-peek mode.

19. The display device of claim 11, further operable in a sharing mode, wherein the cholesteric liquid crystal layer further has a transparent state; and wherein the cholesteric liquid crystal layer is in the transparent state when the display device is in the sharing mode.

20. The display device of claim 19, further operable in an enhanced sharing mode, wherein the cholesteric liquid crystal layer further has a fog state; and wherein the cholesteric liquid crystal layer is in the fog state when the display device is in the enhanced sharing mode.

* * * * *